US009509672B1

(12) United States Patent
Barak et al.

(10) Patent No.: US 9,509,672 B1
(45) Date of Patent: Nov. 29, 2016

(54) PROVIDING SEAMLESS AND AUTOMATIC ACCESS TO SHARED ACCOUNTS

(71) Applicants: Nir Barak, Karmei Yosef (IL); Itzhak Fadida, Haifa (IL); Shalom Shimoni, Rishon LeZion (IL); Amir Jerbi, Giv'atayim (IL)

(72) Inventors: Nir Barak, Karmei Yosef (IL); Itzhak Fadida, Haifa (IL); Shalom Shimoni, Rishon LeZion (IL); Amir Jerbi, Giv'atayim (IL)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/076,169

(22) Filed: Nov. 8, 2013

(51) Int. Cl.
G06F 21/41 (2013.01)
H04L 29/06 (2006.01)

(52) U.S. Cl.
CPC .......... H04L 63/08 (2013.01); H04L 63/0815 (2013.01)

(58) Field of Classification Search
CPC .......... H04L 63/0815; H04L 63/0838; H04L 63/0884; G06F 21/41
See application file for complete search history.

(56) References Cited

U.S. PATENT DOCUMENTS

| 2005/0015628 | A1* | 1/2005 | Narayanan | 713/202 |
| 2008/0034411 | A1* | 2/2008 | Aoyama | 726/5 |
| 2008/0052777 | A1* | 2/2008 | Kawano et al. | 726/18 |
| 2011/0010134 | A1* | 1/2011 | Balla | G06F 17/5004 703/1 |
| 2011/0119771 | A1* | 5/2011 | Postoyko | 726/28 |
| 2011/0277016 | A1* | 11/2011 | Hockings et al. | 726/4 |
| 2011/0296001 | A1* | 12/2011 | Ramstrom | 709/224 |
| 2013/0232541 | A1* | 9/2013 | Kapadia | G06F 21/33 726/1 |
| 2013/0318573 | A1* | 11/2013 | Reunamaki | H04W 12/04 726/4 |
| 2014/0223525 | A1* | 8/2014 | Fadida | H04L 63/083 726/6 |

OTHER PUBLICATIONS

"How can I control privileged user access across the extended enterprise," CA ControlMinder Solution Brief, CA Technologies, Inc., published 2012.
"CA Technologies Strategy and Vision for Cloud Identity and Access Management," White Paper, CA Technologies, Inc., published 2013.
Madimsetty, Sumanth, "Controlling Privileged Users with CA Access Control," CA Access Control Technology Brief, CA Technologies, Inc., published 2010.

* cited by examiner

Primary Examiner — David Pearson
(74) Attorney, Agent, or Firm — Baker Botts L.L.P.

(57) ABSTRACT

A method for providing seamless access to a first account using authentication information associated with a second account includes receiving a first account identifier corresponding to the first account, the first account being a shared account on a computer system. The method also includes receiving submitted authentication information associated with the second account. The method also includes comparing the submitted authentication information with stored authentication information that is associated with a plurality of authorized accounts. The plurality of authorized accounts is associated with clients authorized to access the first account. The method also includes determining whether the second account is an authorized account based on comparing the submitted authentication information with the stored authentication information. The method also includes providing seamless access to the first account in response to determining that the second account is an authorized account.

18 Claims, 9 Drawing Sheets

PROVIDING SEAMLESS AND AUTOMATIC ACCESS TO SHARED ACCOUNTS

BACKGROUND

The present disclosure relates to security and, more specifically, to a method and system for accessing a first account using authentication information associated with a second account.

In an organization, a user or client may log into a protected network using a user or client account or a shared account. Typically, in such networks, shared accounts provide users with more rights or privileges than client accounts. In particular, shared accounts may include privileged accounts such as administrator accounts, superuser accounts, and other accounts with rights and privileges that may be used for system administration. Shared accounts may be exclusive (i.e., only one user or a limited number of users can access the shared account at any given time) or not exclusive (i.e., an unlimited or large number of users can access the shared account at the same time). Existing systems may provide users with permission to access and use a shared account with a password for that shared account. To provide security for the shared account, this password may be modified periodically.

In certain existing systems, a server may manage and control access to shared accounts. A user may be required to log or sign into the server to view a list of shared accounts that the user has authorization to access. Upon viewing the list of shared accounts, the user may check out a particular shared account in the list by selecting that particular shared account. The server then may provide a password for the particular shared account to the user. The user then may use the provided password to access the particular shared account. Once the user is done using the particular shared account, the user may then check in the particular shared account on the server.

However, in such systems, an unauthorized user may gain access to a shared account by learning the password of that shared account. Some existing systems address this problem by periodically changing the password for a shared account. Other existing systems may issue a one-time password for a shared account each time a user checks out that shared account. Nevertheless, by distributing passwords for shared accounts to users, existing systems increase the risk of unauthorized access to shared accounts. Moreover, the process that existing systems require users to undergo in order to obtain passwords for shared accounts may be burdensome and time-consuming.

BRIEF SUMMARY

According to an aspect of the present disclosure, a method for accessing a first account using authentication information associated with a second account may comprise receiving a first account identifier corresponding to the first account, the first account being a shared account on a computer system. The method may further comprise receiving submitted authentication information associated with the second account. The method may further comprise comparing the submitted authentication information with stored authentication information. The stored authentication information may be associated with a plurality of authorized accounts, and the plurality of authorized accounts may be associated with clients authorized to access the first account. The method may further comprise determining whether the second account is an authorized account based on comparing the submitted authentication information with the stored authentication information. The method may further comprise providing seamless access to the first account in response to determining that the second account is an authorized account.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
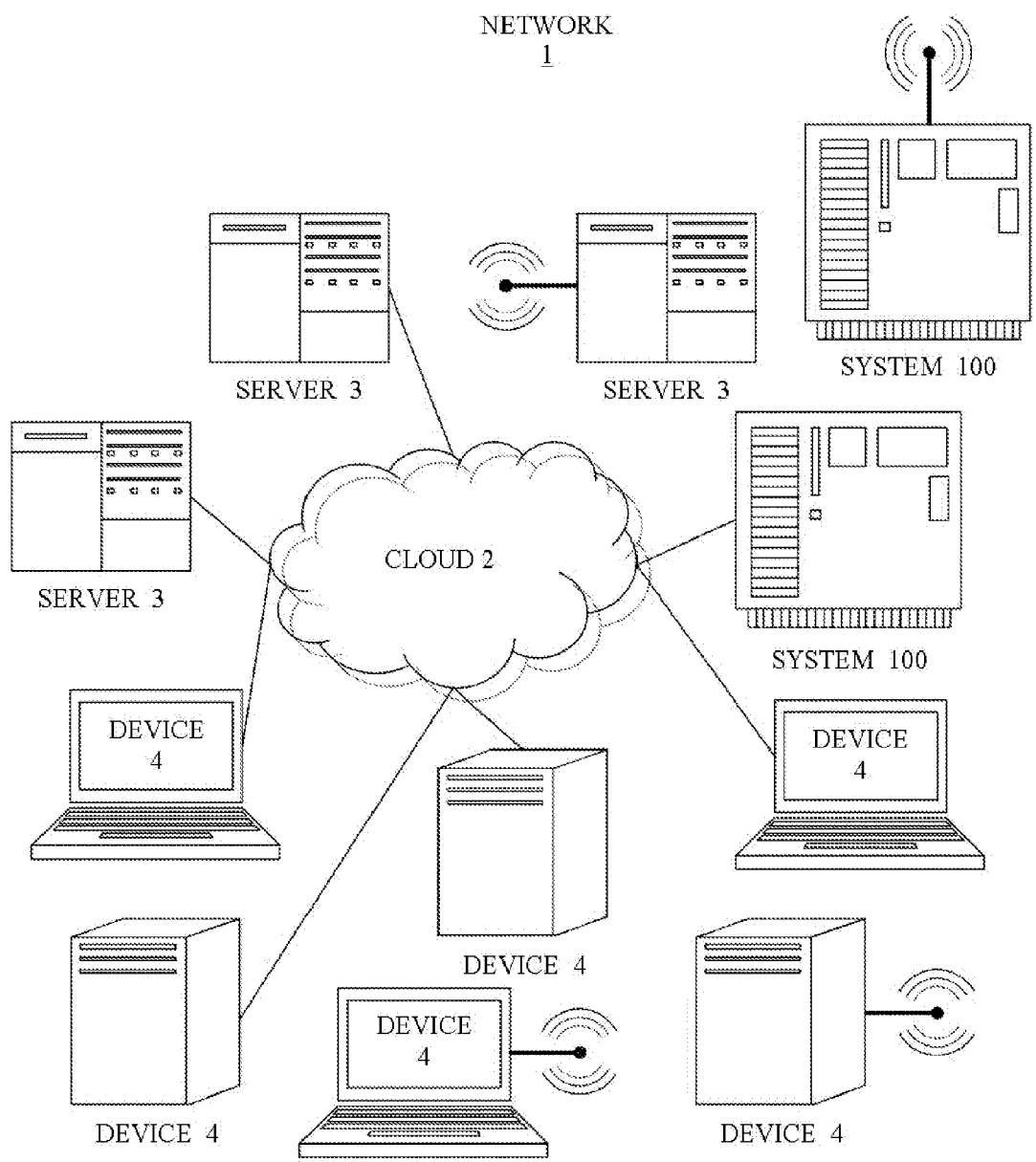
FIG. 1 is a schematic representation of an example network having a device for providing access to a first account using authentication information associated with a second account.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security, security management, and identity and access management, systems and methods disclosed herein may also be related to areas related to clouds and cloud computing (e.g., cloud data management, cloud architecture, cloud information technology ("IT") service and asset management, cloud mainframes, cloud emerging technologies, cloud service assurance, cloud deployment, cloud virtualization), areas related to architecture (e.g., database management, data modeling and analysis, cloud architecture, cloud data management, governance, risk and compliance for IT, project, portfolio, and financial management, software engineering, and big data), areas related to general technology (e.g., application development and databases, cloud emerging technologies, cloud IT service and asset management, cloud mainframe, IT service and asset management, mainframe, middleware and common services, usability and user experience, vertical specific technology applications), areas related to service assurance (e.g., application performance management, service assurance, cloud service assurance), and areas related to virtualization (e.g., alternative software developer methods, cloud deployment, cloud virtualization, infrastructure and operations management).

Referring now to security and security management, in an organization, users or clients may log into a protected server, system, or network using a user or client account or shared account. Typically, shared accounts provide users with more rights and privileges of the system than client accounts. Shared accounts may be privileged accounts such as administrator accounts, superuser accounts, and other accounts with rights and privileges that may be used for system administration. Examples of shared accounts include the "root" account in Unix-like operating systems, the "Administrator" account in the Microsoft Windows operating systems, the "SYS" account in Oracle relational database management systems ("RDBMSs"), and the "sa" or server system administrator account in Microsoft SQL Server.

A privileged user password management ("PUPM") system may be a server that manages and controls access to shared accounts. A PUPM system may be referred to as a shared account management ("SAM") system. According to existing methods, a user may access a SAM system by logging or signing in with his user identifier (e.g., username) and personal authentication information (e.g., password, passcode, security token, personal identification number ("PIN")). After the user logs in, the SAM system may provide the user with a list of shared accounts that the user is authorized to access. The user then may check out a particular shared account from the list of shared accounts. More specifically, the user may select a particular shared account from the list of shared accounts. The SAM system then may set a one-time password for the particular shared account. Concurrently or subsequently, the SAM system may issue the one-time password to the user. The user then may use the one-time password to access the particular shared account. After the user is finished using the particular shared account, the user may check in the particular shared account. More specifically, the user may log in to the SAM system again, select the shared account, and check it back in. Upon checking in the shared account, the SAM system may randomly generate a new password for the shared account, one which is not known to the user.

Accordingly, accessing a shared account using a SAM system is not a seamless login process. The login process involves several manual steps. First, a user must log into the SAM system. Next, the user must search for the shared account that he or she wants to use. After finding the shared account, the user then may check out and obtain a password for the shared account. Users that are required to use such a process must be taught how to use the SAM system and be informed of any changes to the process. Thus, existing systems may not provide a fast and efficient way for users to access a shared account. Such systems require users to undergo a time-consuming login process that involves performing several manual steps. Moreover, such systems may necessitate additional software and hardware in order to allow a user to perform the login process.

Systems and methods disclosed herein provide seamless and automatic access to shared accounts. A user may connect to an endpoint (e.g., a client machine) and wish to access a particular shared account. The user may provide an account identifier corresponding to the particular shared account. For example, if the user wanted to access the "root" account in a Unix-like system, the user may provide the account identifier "root." The user may be a user that is authorized to access the particular shared account. However, the user may not have the password for the particular shared account on hand. Thus, instead of providing the password for the particular shared account, the user may provide his or her global or organizational credentials as an authentication token. Upon receiving the user's organizational credentials, such systems and methods may authenticate the user. Provided that the user is successfully authenticated, such systems and methods may check out the shared account for the user and provide the user with access to the shared account (e.g., log into the computer system for the user using the shared account, thereby providing the user with all of the privileges and rights of the shared account). When the user logs out of the computer system, such systems and methods may also check the particular shared account back in.

Continuing from the last example, the user may provide the account identifier "root." The user may subsequently provide a password for the "root" account (e.g., a one-time password generated by a SAM system) and log into the "root" account. Alternatively or in addition to the password for the "root" account, the user may also provide his or her organizational identity (e.g., a user identifier or PMF key). Such systems and methods then may determine whether the user is a user that is authorized to access the shared account using his or her organizational identity. When such systems and methods determine that the user is an authorized user, such systems and methods may provide the user with access to the shared account.

As another example, a user may want to access the "Administrator" account in a Microsoft Windows operating system. The user may provide the account identifier "Administrator." The user may then provide an organization credential such as a public or private key specific to him or her (e.g., a PIN). Upon receiving that key, such systems and methods may determine the identity of the user and authenticate the user using the key or the key in combination with other submitted information (e.g., a password for a client account belonging to the user).

Accordingly, in such systems and methods, a user may need to provide shared account identification (e.g., information identifying a particular shared account) and user identification (e.g., information identifying the user) in order to gain access to a particular shared account. Nevertheless, the user does not need to provide, for example, a password for the particular shared account.

In systems and methods disclosed herein, a login interceptor may be incorporated into a login program. In particular, the login interceptor may be an extension of a login program. The login interceptor may provide a user with seamless and automatic access to a shared account. A user may connect to an endpoint or end machine and provide a login input (e.g., shared account identification, user identification) to a local login agent. The local login agent may be a password authentication module ("PAM"). The PAM may include the login interceptor (e.g., the login interceptor may be an extension of the local login agent). The user may indicate that he or she wants to log into a shared account. In a simple case, the PAM may determine whether the user is authorized to access the shared account by performing a standard password check. For example, the PAM may check to see whether the user has provided a correct password for the shared account (e.g., the PAM may compare authentication information submitted by the user with a stored password for the shared account and determine whether the submitted authentication information matches the stored password). If the PAM determines that the user has provided a correct password, then the PAM may give the user access to the shared account.

Alternatively, with the login interceptor, the PAM may determine whether the user is authorized to access the shared account by authenticating the user using his or her organizational credentials (e.g., an organizational identity, a user identifier) instead of authentication information specific to the shared account (e.g., a password for the shared account). Upon authenticating the user, the PAM may log into a PUPM or SAM system and check out the shared account on behalf of the user. The PAM may then provide the user with access to the shared account.

In systems and methods disclosed herein, all the steps performed by the login interceptor may originate from an endpoint or end machine (e.g., the machine that the use attempted to log in from). Thus, a user does not need to connect to any other machine to obtain access to a shared account. Also, in such systems and methods, authentication information associated with shared accounts (e.g., shared account credentials) is kept secret. In particular, because such systems and methods provide users with seamless and automatic access to shared accounts, such systems and methods eliminate the need to disclose shared account authentication information to users. In such way, such systems and methods may minimize the risk of shared account authentication information being intentionally or mistakenly shared with an unauthorized user. Because authorized users themselves would not have knowledge of a shared account's authentication information, those users would not be able to distribute that information to other users. Thus, such systems and methods may prevent users from sharing shared account authentication information in an uncontrolled manner. Moreover, since users are not given direct access to shared account authentication information, such systems and methods may reduce the need to maintain and update that information (e.g., a SAM system would not have to randomly generate a new password for a shared account each time it is checked in).

Systems and methods disclosed herein may also reduce an amount of time needed to log into a shared account. As described above, existing systems may require users to perform several manual steps in order to access a shared account. Systems and methods disclosed herein may provide a user with seamless and automatic access to a shared account upon receiving shared account identification and user identification from the user. Thus, for example, a user would not need to spend time checking out and obtaining a password for a shared account from another server (e.g., a SAM system). Moreover, because such systems and methods decrease the number of manual steps that a user has to perform, such systems and methods simplify the login process and allow users to perform their work more efficiently. Specifically, such systems and methods may only require the user to provide shared account identification and user identification in order to obtain access to a shared account. In such way, such systems and methods allow users to access shared accounts in a similar fashion as they would access a user account (e.g., by providing a login input). In addition, if certain features or procedures governing the use of the SAM system or other elements of the login process are changed, then such systems and methods may account for those changes and a user would not have adjust to those changes.

Systems and methods disclosed herein may also provide a more secure way of managing and controlling access to shared accounts. In particular, because authentication information associated with shared accounts is not disclosed to users, that information may be kept secure. Instead, such systems and methods may use authentication information of a user (e.g., a password or shared secret associated with a user account, a one-time token or password generated by a key generator) to authenticate a user and provide access to the shared account. To prevent unauthorized users from falsely presenting themselves as authorized users, such systems and methods may put in place strong authentication methods at the user level. In particular, such systems and methods may require users to change passwords for their user accounts more frequently (e.g., increase the password obsolescence period). Alternatively, such systems and methods may require users to use a one-time password each time they log into the system.

In systems and methods disclosed herein, a user such as an administrator that has knowledge of a password for a shared account (e.g., authentication information associated with a shared account) may still access the shared account using the password. Thus, authorized users having authentication information associated with a shared account on hand may still access that shared account by directly logging into the shared account.

Additionally, systems and methods disclosed herein may provide a user with access to a shared account without checking out the shared account but by auditing the shared account. Specifically, systems and methods may record or log details of actions performed by the user and information created or modified by the user while the user is logged into the shared account. The recorded details (e.g., audit trail) may subsequently be forwarded to another user (e.g., an administrator, an owner of the shared account, security personnel) for review. If that other user determines that the user engaged in any unacceptable use, then that other user may act upon such use (e.g., contact the user, undo the user's actions or changes within the shared account, escalate the issue to a manager).

Systems and methods disclosed herein may also be configured to perform "breakglass" operations in emergency situations. Such an operation may comprise, for example, providing a user with access to a shared account or the privileges and rights associated with a shared account even if that user does not have permission to access the shared account. For instance, a user may provide a password for use during emergency situations. Upon receiving that password, such systems and methods may log the user into the shared account, despite knowing that the user is not authorized to access the shared account. Alternatively, a user may indicate that he or she wants to log into an emergency account that may provide the user with similar rights and privileges as the shared account. Upon receiving the password for that emergency account, such systems and methods may provide the user with access to the emergency account or direct access to the shared account.

Systems and methods disclosed herein may also be configured to request approval for a user to access a shared account from a manager or owner of the shared account. Such systems and methods may block the user's login until the manager or owner of the shared account provides approval. When approval is not received within a certain period of time, such systems and methods may terminate the user's login (e.g., fail the user's login) and notify the user to attempt logging in later when the manager or owner of the shared account has approved the request.

Referring now to FIG. 1, an example network 1, in which a device for providing access to a first account using authentication information associated with a second account operates, now is described. Network 1 may be a private or protected network. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information and provisioning of services among users that are connected to cloud 2.

Network 1 may comprise one or more servers 3 and other devices operated by service providers, information providers, administrators (e.g., network administrators, system administrators, security administrators, database administrators), and other parties. Network 1 also may comprise one or more devices 4 utilized by service consumers, information consumers, and other users. Service providers and information providers may provide information and services to information consumers and service consumers utilizing the one or more servers 3, which connect to the one or more devices 4 via cloud 2. The services may comprise, for example, IT services, cloud services, security services, access services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Certain devices 4 may comprise a memory and a processor. Example items may include network 1, cloud 2, servers 3, and devices 4.

Moreover, network 1 may comprise one or more systems 100. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may monitor network 1, cloud 2, servers 3, devices 4, and other devices in network 1. System 100 may collect and receive information (e.g., access information, user information, authentication information, account information, system information, other variable information) from network 1, cloud 2, servers 3, devices 4, and other devices in network 1. By collecting and receiving this information from network 1, cloud 2, servers 3, devices 4, and other devices in network 1, system 100 may provide a user with access to a first account using authentication information associated with a second account. Specifically, system 100 may receive an account identifier corresponding to the first account. System 100 may also receive submitted authentication information associated with the second account. System 100 then may compare the submitted authentication information with stored authentication information and determine whether the second account is an authorized account (e.g., an account associated with a user or client authorized to access the first account). Depending on whether the second account is an authorized account, system 100 may provide access to the first account.

In some configurations, one or more of servers 3 and devices 4 may comprise system 100. In other configurations, system 100 may be separate from servers 3 and devices 4.

Figure 2:
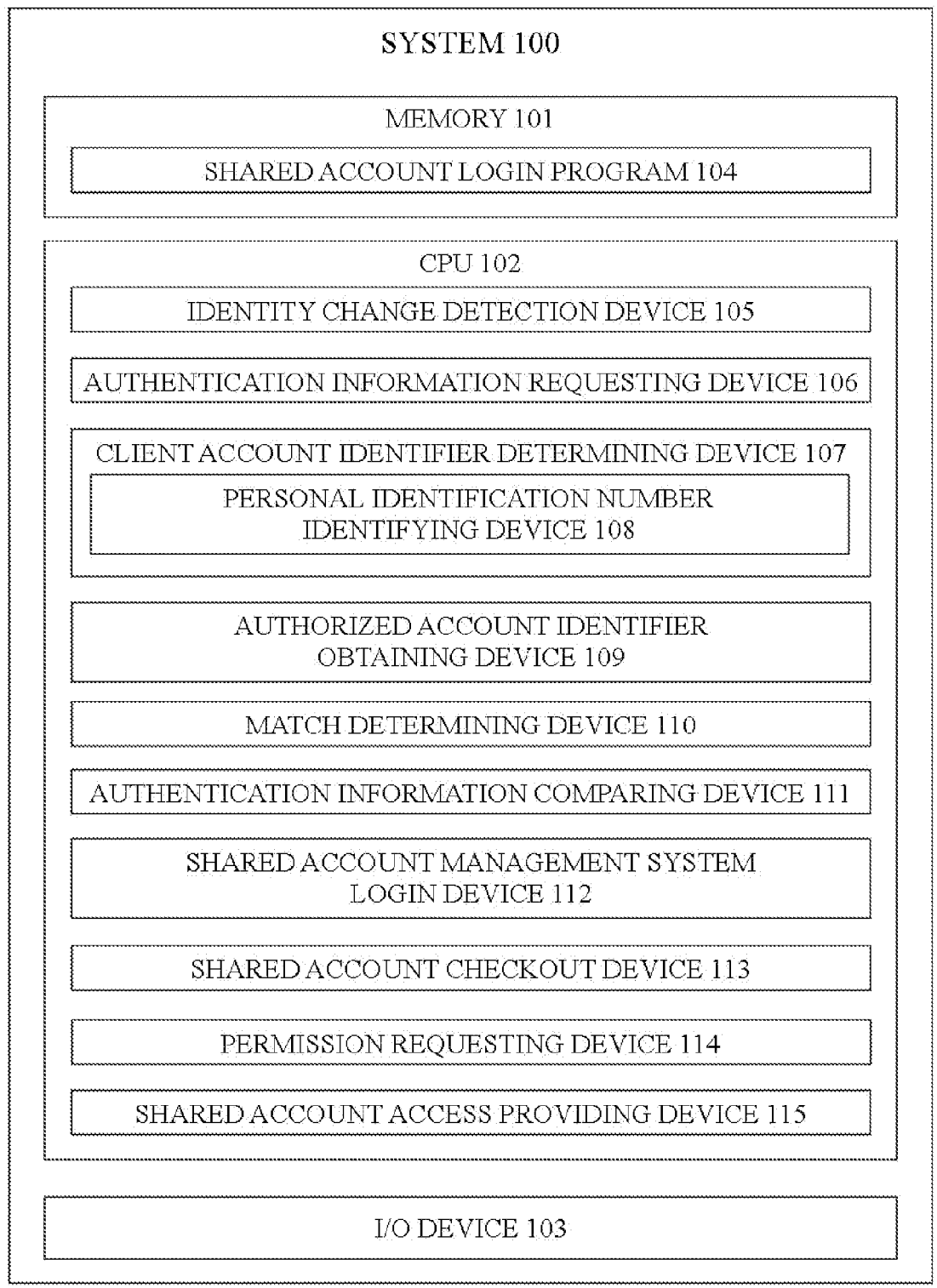
FIG. 2 is a schematic representation of an example system configured to provide access to a first account using authentication information associated with a second account.

Referring now to FIG. 2, system 100, which is configured to provide access to a first account using authentication information associated with a second account, now is described. System 100 may comprise a memory 101, a central processing unit ("CPU") 102, and an input and output ("I/O") device 103. Memory 101 may store computer-readable instructions that may instruct system 100 to perform certain processes. Specifically, the computer-readable instructions stored in memory 101 may comprise a shared account login program 104. The shared account login program, when executed by CPU 102, may instruction CPU 102 to operate as one or more of an identity change detection device 105, an authentication information requesting device 106, a client account identifier determining device 107, an authorized account identifier obtaining device 109, a match determining device 110, an authentication information comparing device 111, a shared account management system login device 112, a shared account checkout device 113, a permission requesting device 114, and a shared account access providing device 115. CPU 102, acting as client account identifier determining device 107, may further act as a key identifying device 108.

In particular configurations, one or more of identity change detection device 105, authentication information requesting device 106, client account identifier determining device 107, authorized account identifier obtaining device 109, match determining device 110, authentication information comparing device 111, shared account management system login device 112, shared account checkout device 113, permission requesting device 114, and shared account access providing device 115 may be implemented on one or more different CPUs, which may be comprised in remote or local devices.

I/O device 103 may receive one or more of data from cloud 2, data from other devices and sensors connected to system 100, and input from a user and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement one or more of wireless and wired communications between system 100 and other devices.

Figure 3:
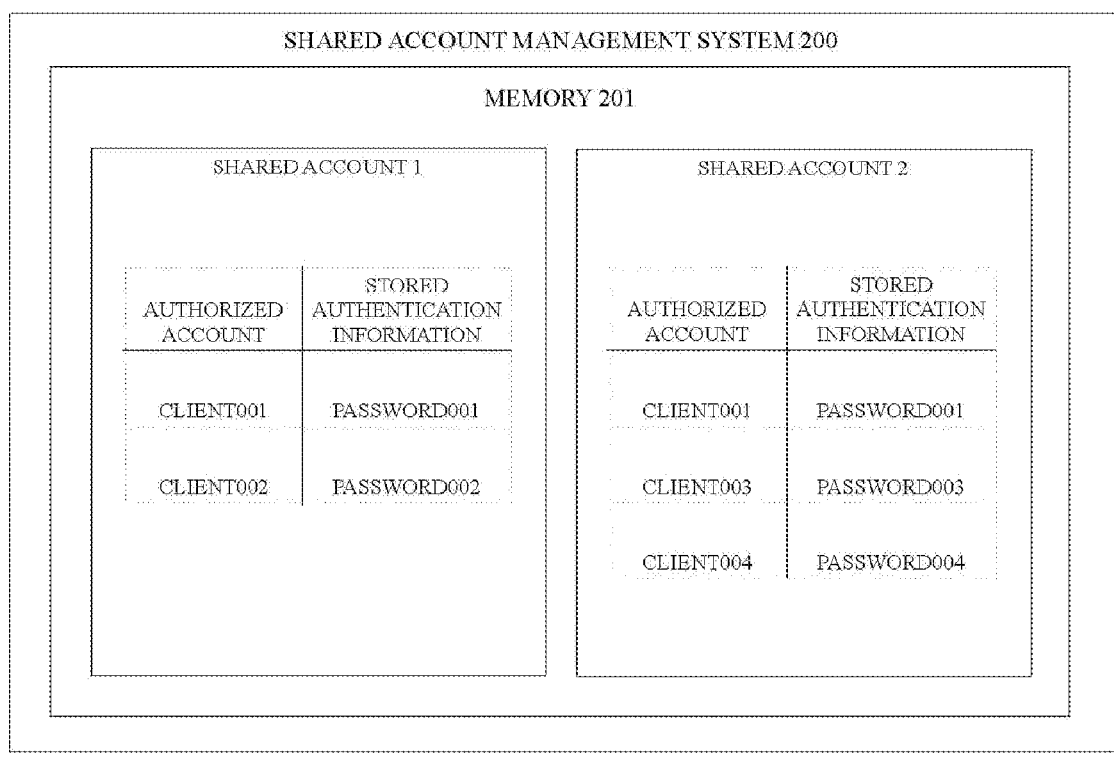
FIG. 3 is a schematic representation of an example shared account management system that manages and controls access to a first account.

Referring now to FIG. 3, a shared account management system 200, which is configured to manage and control access to a first account, now is described. The shared account management system 200 may be represented by a server 4 in network 1. The shared account management system 200 may manage and control access to one or more shared accounts on network 1 (e.g., a private or protected network). Specifically, the one or more shared account may comprise a shared account 1 and a shared account 2. A shared account may be an account that is shared by one or more users or clients. In other words, a shared account is typically not associated with a particular user. Rather, a shared account may be accessed by a group of users. Shared accounts may be non-exclusive or exclusive accounts. When a shared account is an exclusive account, only one user (or a limited number of users) is allowed to use the shared account at one time. When a shared account is a non-exclusive account, any number of users are allowed to use the account at one time. Examples of shared accounts include administrator or supervisor accounts (e.g., the "root" account in Unix-like operating systems, the "Administrator" account in Microsoft Windows operating systems, the "SYS" account in Oracle database management systems).

One or more clients (e.g., users) may be authorized to access each of shared account 1 and shared account 2. A client account may be associated with each of those one or more clients. Specifically, in FIG. 3, two clients may be authorized to access shared account 1, and three clients may be authorized to access shared account 2. A first client account may be associated with a first client. The first client may be authorized to access shared account 1 and shared account 2. The first client account may have an account identifier "Client001." A second client account may be associated with a second client. The second client may be authorized to only access shared account 1. The second client account may have an account identifier "Client002." A third client account may be associated with a third client. The third client may be authorized to access shared account 2. The third client account may have an account identifier "Client003." And, a fourth client account may be associated with a fourth client. The fourth client may be authorized to access shared account 2. The fourth client account may have an account identifier "Client004."

Each account that is associated with a client that is authorized to access a shared account may be referred to as an "authorized account" of that shared account. Thus, in FIG. 3, the first client account and the second client account may be authorized accounts of shared account 1. Similarly, the first client account, the third client account, and the fourth client account may be authorized accounts of shared account 2.

Shared account management system 200 may store authentication information (e.g., a password, a passcode, a passphrase, or other secret key) for each of the authorized accounts of a shared account. Such authentication information may be referred to as "stored authentication information." Thus, for the first client account, shared account management system 200 may have stored authentication information such as a stored password "Password001." For the second client account, shared account management system 200 may have stored authentication information such as a stored password "Password002." For the third client account, shared account management system 200 may have stored authentication information such as a stored password "Password003." And, for the fourth client account, shared account management system 200 may have stored authentication information such as a stored password "Password004."

To obtain access to a shared account managed by shared account management system 200 (e.g., shared account 1, shared account 2), a user may manually log into shared account management system 200 and check out the shared account. Specifically, a user may log into shared account management system 200 by providing an account identifier corresponding to a client account associated with the user (e.g., a username of a client account) and authentication information associated with that client account (e.g., a password, a passcode, a security token, a PIN). After the user logs in, shared account management system 200 may provide the user with a list of shared accounts that the user is authorized to access. Specifically, shared account management system 200 may determine of which shared accounts the user's client account is an authorized account. Shared account management system 200 then may provide a list of those shared accounts (e.g., a list of account identifiers corresponding to those shared accounts) to the user. The user may then manually check out a particular shared account. Specifically, the user may check out the particular shared account by selecting that shared account and performing a check out action (e.g., pressing a button marked "Check Out," checking a box marked "Check Out," double clicking on an icon that corresponds to the shared account). Checking out the particular shared account may further comprise requesting and receiving authentication information associated with the particular shared account. As described above, such authentication information may be a one-time password for access the shared account. The user then may use the authentication information to gain access to the shared account (e.g., by manually logging into the shared account using the authentication information).

Figure 4:
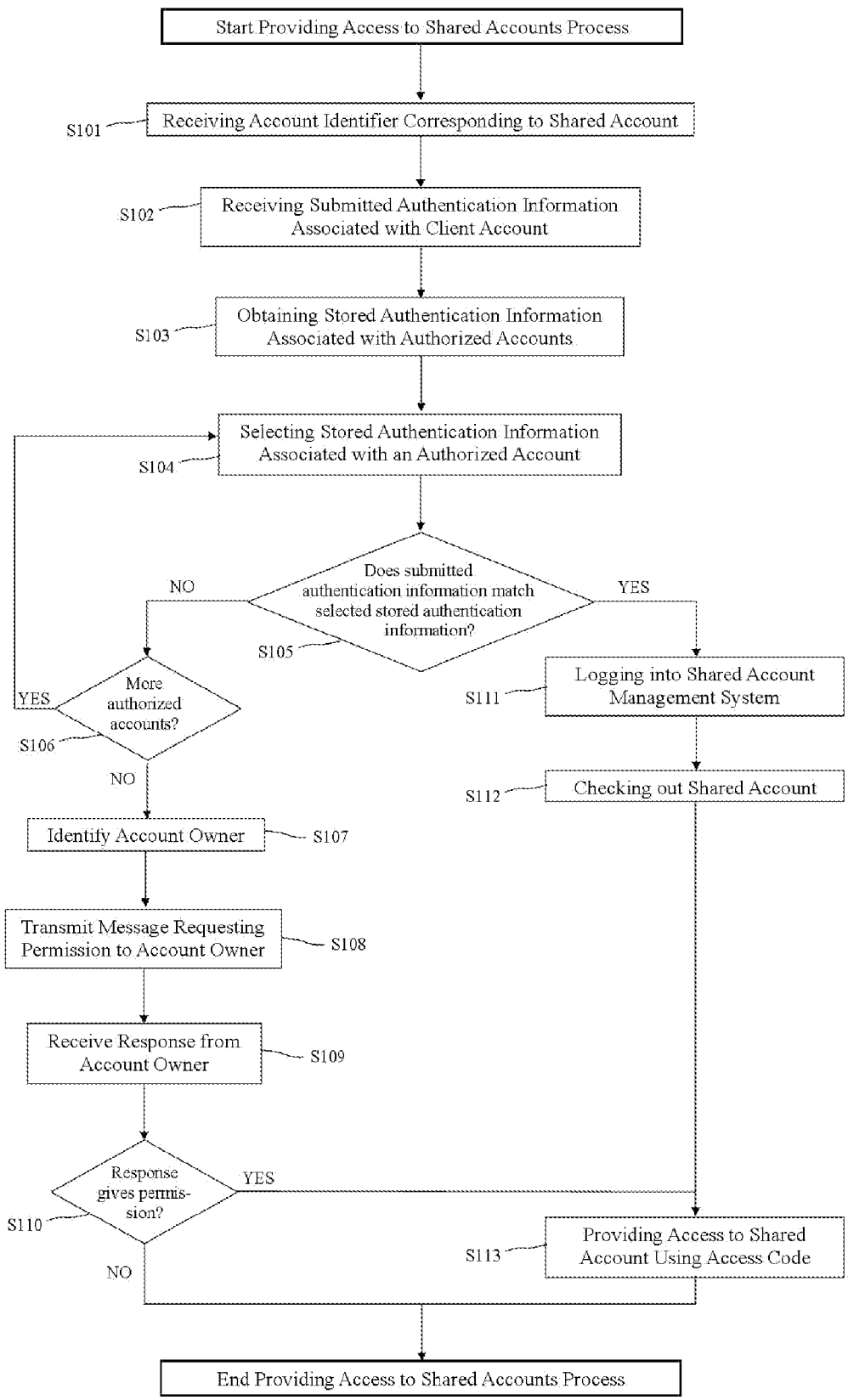
FIG. 4 illustrates an example process of providing access to a first account using authentication information associated with a second account.

Referring now to FIGS. 4-7, example processes performed by identity change detection device 105, authentication information requesting device 106, client account identifier determining device 107, authorized account identifier obtaining device 109, match determining device 110, authentication information comparing device 111, shared account management system login device 112, shared account checkout device 113, permission requesting device 114, and shared account access providing device 115 now are described. FIG. 4 depicts an example process of providing access to a first account using authentication information associated with a second account.

A user may want to access a first account on a private or protected network. The first account may be a shared account on network 1 (e.g., a computer network). Specifically, the first account may be, for example, shared account 1 or shared account 2. That private or protected network may be network 1, as depicted in FIG. 1. On a computer system (e.g., a local device, a workstation, a user or client machine), the user may provide (e.g., submit) a first account identifier corresponding to the first account. For example, when the first account is shared account 1, the user may provide a first account identifier corresponding to shared account 1. As another example, when the first account is shared account 2, the user may provide a first account identifier corresponding to shared account 2. The computer system may correspond to, for example, a device 4 or other device in network 1. The computer system may comprise a memory and a processor. The computer system's memory may store instructions (e.g., software, firmware, resident software, micro-code) such as an operating system. The user may also provide authentication information associated with a second account. The second account may be a client account (e.g., an individual user account, a personal account). Specifically, the second account may be the first client account, the second client account, the third client account, the fourth client account, or another client account. The authentication information provided by the user may be referred to as "submitted authentication information" (e.g., authentication information that was submitted by the user).

The first account identifier corresponding to the first account and the submitted authentication information may be transmitted by the computer system to system 100. In S101 and S102, system 100 may receive the first account identifier and the submitted authentication information, respectively. Specifically, I/O device 103 may receive the first account identifier and the submitted authentication information and provide the first account identifier and the submitted authentication information to CPU 102. Then, in S103, authentication information comparing device 111 may obtain stored authentication information associated with one or more authorized accounts of the first account. Accordingly, when the first account is shared account 1, authentication information comparing device 111 may obtain stored authentication information associated with the first client account and the second client account. Specifically, that stored authentication information may comprise the stored password "Password001" and the stored password "Password002." Alternatively, when the first account is shared account 2, authentication information comparing device 111 may obtain stored authentication information associated with the first client account, the third client account, and the fourth client account. Specifically, that stored authentication information may comprise the stored password "Password001," the stored password "Password003," and the stored password "Password004." Obtaining the stored authentication information may comprise, for example, transmitting a message to shared account management system 200, requesting the stored authentication information. Shared account management system 200 then may transmit the stored authentication information to system 100. Obtaining the stored authentication information may also comprise connecting to shared account management system 200, locating the stored authentication information, and retrieving and/or referencing the stored authentication information.

Then, in S104, authentication information comparing device 111 may select stored authentication information associated with a first authorized account of the first account. For example, if the first account is shared account 1, then authentication information comparing device 111 may select the stored password "Password001." Recall, the stored password "Password001" is the stored authentication information associated with the first client account, and the first client account is an authorized account of shared account 1. Then, in S105, authentication information comparing device 111 may compare the submitted authentication information with the stored authentication information of the first authorized account. Specifically, authentication information comparing device 111 may determine whether the submitted authentication information matches the stored authentication information of the first authorized account. Thus, continuing from above, when the submitted authentication information is "Password001," authentication information comparing device 111 may determine that the submitted authentication information matches the stored authentication information of the first authorized account. Alternatively, when the submitted authentication information is not "Password001," authentication information comparing device 111 may determine that the submitted authentication information does not match the stored authentication information.

When the submitted authentication information matches the stored authentication information (S105: YES), the process may proceed to S107. In S107-S110, CPU 102, acting as one or more of shared account management system login device 112, shared account checkout device 113, shared account access code obtaining device 114, and shared account access providing device 115 may automatically and seamlessly check out the first account on behalf of the user. Specifically, client account identifier determining device 107 may determine a second account identifier corresponding to the second account. For example, when the second account is the first client account, client account identifier determining device 107 may determine a second account identifier of "Client001." FIG. 6, described below, provides a more detailed view of this process. Then, in S111, shared account management system login device 112 may log into shared account management system 200 (e.g., a shared account management system) using the submitted authentication information. Specifically, shared account management system login device 112 may log into shared account management system 200 with the second account identifier and the submitted authentication information. Shared account management system 200 may detect the login and provide a list of shared accounts of which the second account is an authorized account (e.g., a list of shared account that the user of the second account is authorized to access via the second account). The list of such shared accounts may comprise a list of account identifiers corresponding to those shared accounts. In particular, the list of such shared account may comprise an account identifier corresponding to the first account.

In S112, shared account checkout device 113 may check out the first account. Specifically, shared account checkout device 113 may transmit a signal to shared account management system 200, wherein the signal comprises a request to check out the first account. Upon receiving the signal, shared account management system 200 may flag the account as checked out and provide authentication information associated with the particular shared account to system 100. As described above, such authentication information may comprise a one-time password for the first account. I/O device 103 of system 100 may receive the authentication information associated with the first account and provide such authentication information to CPU 102. Then, in S113, shared account access providing device 115 may provide access to the first account. Specifically, shared account access providing device 115 may log into the shared account using the authentication information associated with the first account. The process may then terminate.

When the submitted authentication information does not match the stored authentication information (S105: NO), the process may proceed to S106. In S106, authentication information comparing device 111 may determine whether there are more authorized accounts. For example, continuing from above, if the first account is shared account 1, then a second authorized account may be the second client account. When authentication information comparing device 111 determines that there are more authorized accounts (S106: YES), the process may proceed back to S104, and authentication information comparing device 111 may select stored authentication information associated with a new authorized account. When authentication information comparing device 111 determines that there are no more authorized accounts (S106: NO), the process may proceed to S107.

In S107-S110, permission requesting device 114 may perform a permission request. Specifically, in S107, permission requesting device 114 may identify an owner of the first account. Permission requesting device 114 may refer to information stored locally (e.g., information stored within system 100) or remotely (e.g., information stored on another server) to identify the owner of the first account. Then, in S108, permission requesting device 114 may request permission for the user to access the first account from the owner of the first account. In particular, permission requesting device 114 may transmit a message requesting permission for the user to access the first account to the owner of the first account. Specifically, permission requesting device 114 may direct I/O device 103 to transmit the message requesting permission to the owner of the first account. In S109, permission requesting device 114 may receive a response from the owner of the first account. When the response provides permission for the user to access the first account (S110: YES), the process may proceed to S113, where shared account access providing device 115 may provide access to the first account in response to receiving permission to access the first account. Specifically, shared account access providing device 115 may generate and transmit a signal (e.g., a positive authentication signal) or instruction to the computer system that the user is on or other device (e.g., a device that is connected to the computer system). Upon receiving the signal or instruction, the computer system may log the user into the first account on the private or protected network. Accordingly, the user may gain access to services and information linked to the first account. Moreover, the user may be granted the rights and privileges of the first account. If the first account is a privileged account such as an administrator account or a superuser account, the user may obtain rights and privileges that may be used for network, system, or server administration. When the response does not provide permission for the user to access the first account (S110: NO), the process may terminate.

In certain configurations, there may be more than one owner of the first account. In such configurations, when permission requesting device 114 determines the identities of the owners of the second account, permission requesting device 114 may direct I/O device 103 to transmit the message requesting permission to each of the owners of the first account. When permission requesting device 114 receives permission to access the first account from one of the owners of the first account (S110: YES), the process may proceed to S113.

In particular configurations, S107-S110 may be omitted. Accordingly, in such configurations, when authentication information comparing device 111 determines that the submitted authentication information does not match the stored authentication information of any of the authorized accounts, the process may terminate. In some configurations, S111-S112 may be omitted. Thus, when authentication information comparing device 111 determines that the submitted authentication information matches the stored authentication information associated with an authorized account (S105: YES), the process may proceed directly to S113, where shared account access providing device 115 may generate and transmit a signal or instruction to the user's computer system. In certain configurations, S102 may be performed before or concurrently with S101.

Figure 5:
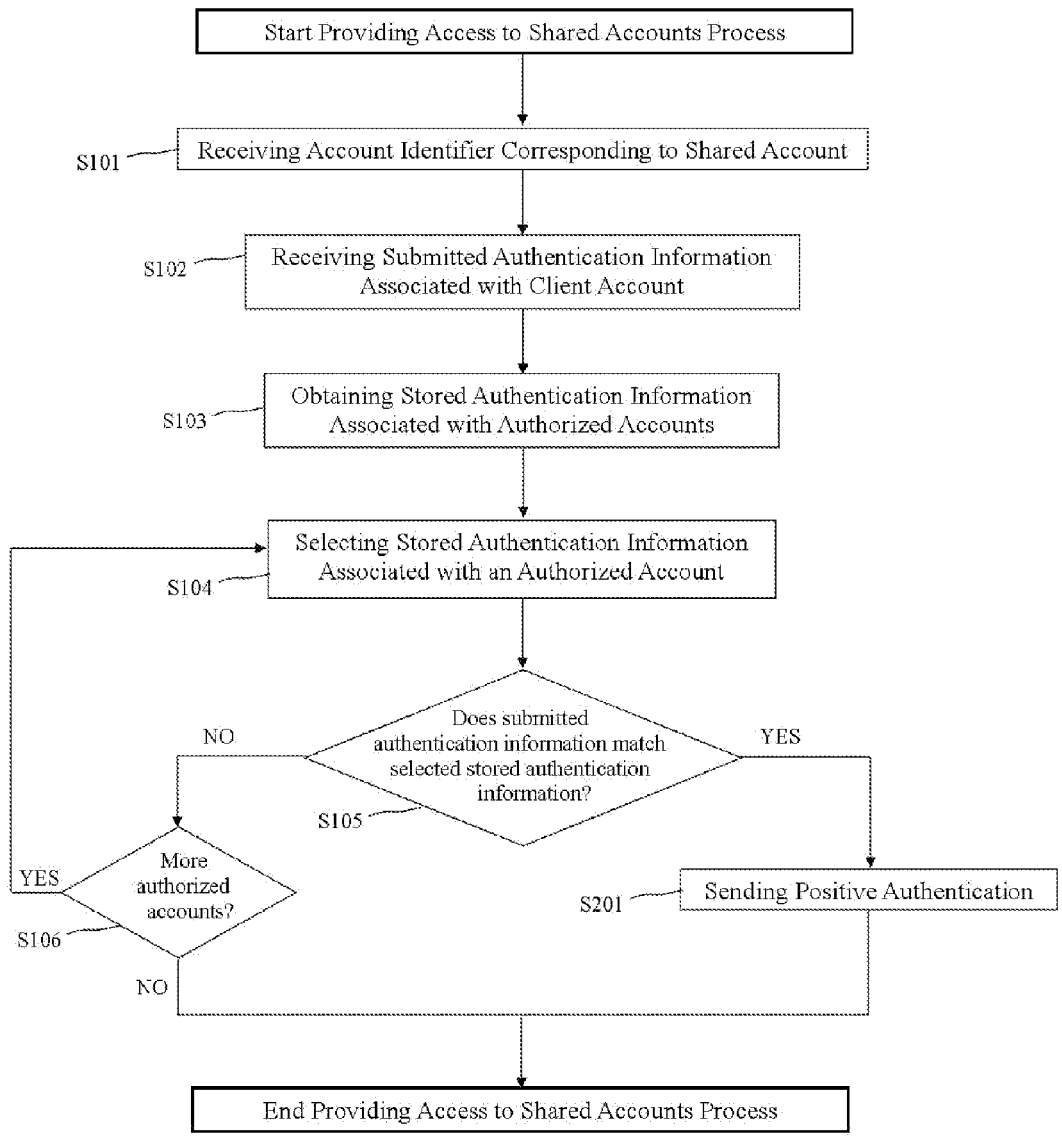
FIG. 5 illustrates another example process of providing access to a first account using authentication information associated with a second account.

FIG. 5, which provides another example process of providing access to a first account using authentication information associated with a second account, now is described. S101-S106 as depicted in FIG. 5 may be the same as S101-S106 as depicted in FIG. 4. But, in FIG. 5, when authentication information comparing device 111 determines that the submitted authentication information matches the stored authentication information associated with an authorized account (S105: YES), the process may proceed to S201 instead of S111.

In S201, shared account access providing device 115 may send a positive authentication signal to the computer system (e.g., a computer). The positive authentication signal may comprise a letter, word, phrase, number, or other alphanumeric sequence that represents to the computer that the client account is an authorized account of the first account and/or that the user is authorized to access the first account. For security purposes, the positive authentication signal may be an encoded signal that is decoded by the computer system or a component of the computer system (e.g., a decoder on the computer system) upon receipt. Upon receiving the positive authentication signal, the computer system may log the user into the first account on the private or protected network. Specifically, the positive authentication signal may be received by the computer system and interpreted by a kernel. The kernel may be a component of the computer system. The kernel may interface with the processor of the computer system. More specifically, the kernel may serve as a bridge between system 100 and the processor of the computer system. Upon interpreting the positive authentication signal, the kernel may generate an instruction or direct another component of the computer system to generate an instruction, which, when executed by the processor of the computer system, provides the user with access to the first account.

Figure 6:
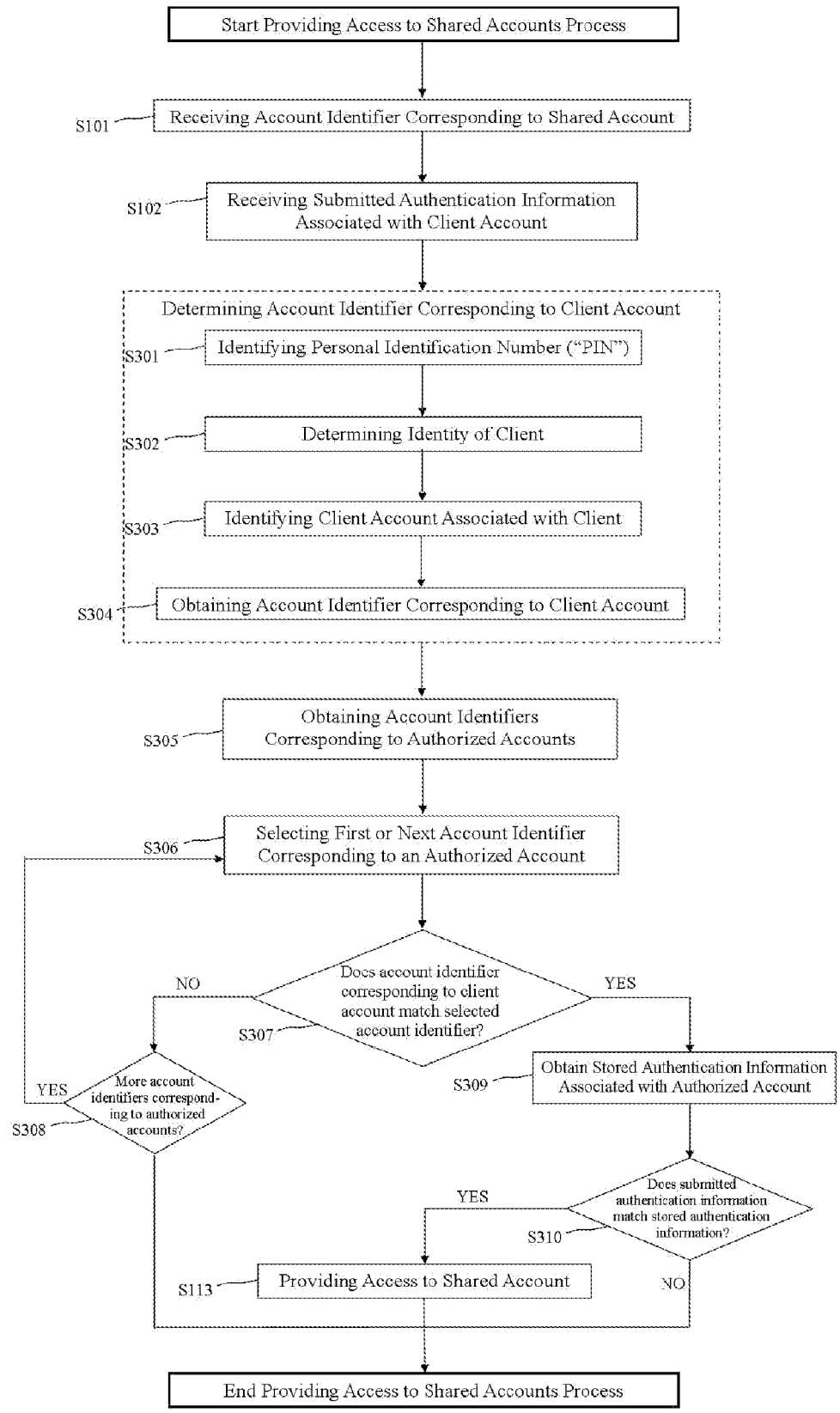
FIG. 6 illustrates yet another example process of providing access to a first account using authentication information associated with a second account.

Referring now to FIG. 6, yet another example process of providing access to a first account using authentication information associated with a second account now is described. S101, S102, and S113 as depicted in FIG. 6 are the same as S101, S102, and S113 as depicted in FIG. 4. In S301-S304, client account identifier determining device 107 may determine a second account identifier using a key. The second account identifier may be an account identifier corresponding to the second account. Client account identifier determining device 107 may comprise a key identifying device 108. In S301, key identifying device 108 may identify a key associated with an owner of the second account. The owner of the second account may be the user. The key may comprise a PIN or other information that may be used to identify the user (e.g., a security token issued specifically to the user). The user may have provided such a key as a part of the submitted authentication information (e.g., the submitted authentication information may comprise such a key). Thus, when the user has already provided the key, key identifying device 108 may identify the key in the submitted authentication information. More specifically, when the user provided the submitted authentication information, the user may have been asked to provide the authentication information consistent with a particular scheme. For example, the user may have been asked to provide a PIN followed by a password for the second account. Key identifying device 108 may be familiar with the particular scheme. Accordingly, key identifying device 108 may identify the key by applying the particular scheme to the submitted authentication information. When the user has not provided the key (e.g., the submitted authentication information does not comprise the key), key identifying device 108 may direct I/O device 103 to request and receive the key from the user.

Then, in S302, client account identifier determining device 107 may determine an identity of the user (e.g., a client). Client account identifier determining device 107 may refer to information stored locally (e.g., information stored within system 100) or remotely (e.g., information stored on another server) to determine the identity of the user. For example, a server may store information on the keys that are assigned to user. Client account identifier determining device 107 may interface with that server and use the key provided by the user to determine the identity of the user. In S303, client account identifier determining device 107 may identify the second account based on the identity of the user. Specifically, because the user is the owner of the second account, identifying the second account may comprise determining which account is owned by the user. Then, in S304, client account identifier determining device 107 may obtain the second account identifier. Similar to the above, this process may comprise referring to information that is stored locally or remotely.

In S305, authorized account identifier obtaining device 109 may obtain additional account identifiers corresponding to one or more authorized accounts of the first account. This process may be similar to S103, described above. For example, when the first account is shared account 1, authorized account identifier obtaining device 109 may obtain additional account identifiers corresponding to the first client account and the second client account. Specifically, those additional account identifiers may comprise the account identifier "Client001" and the account identifier "Client002." Alternatively, when the first account is shared account 2, authorized account identifier obtaining device 109 may obtain additional account identifiers corresponding to the first client account, the third client account, and the fourth client account. Specifically, those additional account identifiers may comprise the account identifier "Client001," the account identifier "Client003," and the account identifier "Client 004." Obtaining the additional account identifiers may comprise, for example, transmitting a message to shared account management system 200, wherein the message comprises a request for the additional account identifiers. Shared account management system 200 may then transmit the additional account identifiers to system 100. Obtaining the stored authentication information may also comprise connecting to shared account management system 200, locating the additional account identifiers, and retrieving and/or referencing the additional account identifiers.

Then, in S306, match determining device 110 may select an additional account identifier that corresponds to a first authorized account of the first account. For example, if the first account is shared account 1, then match determining device 110 may select the account identifier "Client001" (e.g., the account identifier corresponding to the first client account). Then, in S307, match determining device 110 may determine whether the second account identifier matches the account identifier of the first authorized account. Thus, for example, if client account identifier determining device 107 determined that the second account was the first client account, then the second account identifier would be "Client001" and would match the account identifier "Client001." Alternatively, if client account identifier determining device 107 determined that the second account was not the first client account, then the second account identifier may not match the account identifier "Client001."

When the second account identifier matches the account identifier corresponding to the first authorized account (S307: YES), the process may proceed to S309. In S309, authentication information comparing device 111 may obtain stored authentication information associated with the first authorized account (e.g., the authorized account that was selected by match determining device 110). This process may be similar to S103, except that authentication information comparing device 111 may obtain only stored authentication information associated with a particular authorized account. Then, in S310, authentication information comparing device 111 may compare the submitted authentication information with the stored authentication information associated with the first authorized account. Specifically, authentication information comparing device 111 may determine whether the submitted authentication information matches the stored authentication information associated with the first authorized account. Thus, continuing from the last example, when the submitted authentication information is "Password001," authentication information comparing device 111 may determine that the submitted authentication information matches the stored authentication information associated with the first authorized account.

When the submitted authentication information matches the stored authentication information associated with the first authorized account (S310: YES), the process may proceed to S113, where shared account access providing device 115 may provide access to the first account. When the submitted authentication information does not match the stored authentication information associated with the first authorized account (S310: NO), the process may terminate.

Returning to S307, when the second account identifier does not match the account identifier corresponding to the first authorized account (S307: NO), the process may proceed to S308. In S308, match determining device 110 may determine whether there are more additional account identifiers that correspond to an authorized account of the first account. For example, continuing from above, if the first account is shared account 1, then an additional account identifier may be "Client002," the account identifier corresponding to the second client account. When match determining device 110 determines that there are more additional account identifiers (S307: YES), the process may proceed back to S306, and match determining device 110 may select an additional account identifier corresponding to an authorized account of the first account. When match determining device 110 determines that there are no more additional account identifiers (S307: NO), the process may terminate.

In certain configurations, S301-S303 may be omitted. In such configurations, client account identifier determining device 107 may directly receive the second account identifier from the user. The user may have provided the second account identifier as a part of the submitted authentication information. Alternatively, client account identifier determining device 107 may request and receive the second account identifier from the user. In particular configurations, in S303, client account identifier determining device 107 may identify more than one account as owned by the user. In such configurations, S304-S310 may be repeated for each account identified as owned by the user until authentication information comparing device 111 determines that the submitted authentication information matches stored authentication information associated with an authorized account of the first account (S310: YES), at which point, the process may proceed to S113 and terminate thereafter.

Figure 7:
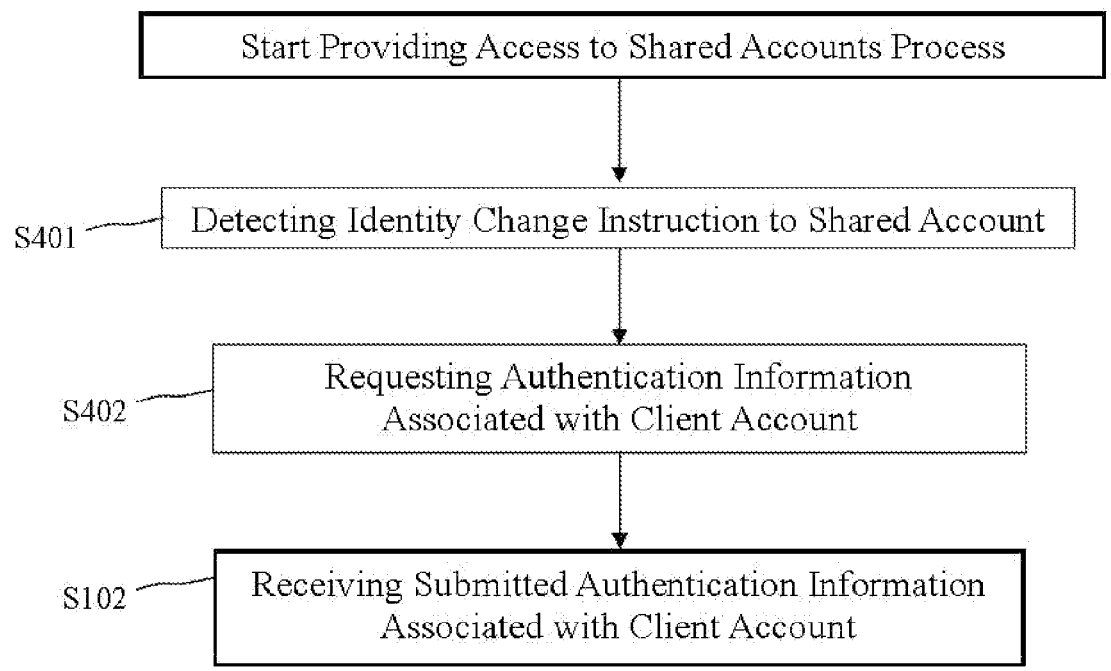
FIG. 7 illustrates a process of detecting an identity change instruction to switch to a first account, requesting authentication information associated with a second account, and providing access to the first account using the authentication information associated with the second account.

Referring now to FIG. 7, an example process of detecting an identity change instruction to switch to a first account, requesting authentication information associated with a second account, and providing access to the first account using the authentication information associated with the second account now is described. In S401, identity change detection device 105 may detect an identity change instruction to switch to the first account. In particular, identity change detection device 105 may monitor (e.g., examine, analyze) the data and instructions provided by the user and identify an identity change instruction. Recall that the first account may be a shared account and that, typically, shared accounts may have more rights and privileges than individual client accounts. Thus, when a user wants to perform an action (e.g., run a file, execute a command) but the user's individual client account does not have sufficient privileges, the user may want to gain access to a shared account. To gain access to a shared account, the user may, under existing methods, log into a SAM system, check out the shared account and obtain a password for the shared account, and log into the shared account using that password. Nevertheless, such a process involves several manual steps and may be time-consuming. In systems and methods disclosed herein, a user may log into a shared account using authentication information associated with an account other than the shared account (e.g., a client account). Specifically, the user may provide as a login input an account identifier corresponding to the shared account and authentication information associated with the other account. Nevertheless, there may be situations where the user may wish to switch to a shared account from another account. In such situations, the user may attempt to use an identity change instruction to switch from the other account to the shared account.

As suggested above, an identity change instruction may comprise an instruction to switch to another account. That other account may be referred to as a "target account." For example, in a Unix-like operating system, a user may use an identity change instruction "su" to switch to an administrator account "root." When a user provides an identity change instruction to switch to the first account, identity change detection device 105 may detect that identity change instruction. At the same time, system 100 may receive the first account identifier corresponding to the first account. In S402, authentication information requesting device 106 may then request authentication information. Requesting the authentication information may comprise prompting the user for the authentication information. More specifically, authentication information requesting device 106 may generate a script (e.g., a program, an instruction), which, when executed by a computer (e.g., the computer system that the user is on), may cause the computer to prompt the user for the authentication information. The user may provide authentication information associated with the second account, and such authentication information (e.g., submitted authentication information) may be received by system 100. The process thus proceeds to S102 and may continue through the rest of the steps depicted in FIG. 4.

In certain configurations, S402 may be omitted. In such configurations, system 100 may obtain authentication information submitted by the user from a stored location (e.g., a server 3, device 4, or other device in network 1). For instance, the user may have previously logged into the second account via the computer system. When the user logged into the second account, the computer system may have stored the user's login input, which may include authentication information associated with the second account. Thus, authentication information requesting device may obtain that authentication information from the computer system.

Figure 8:
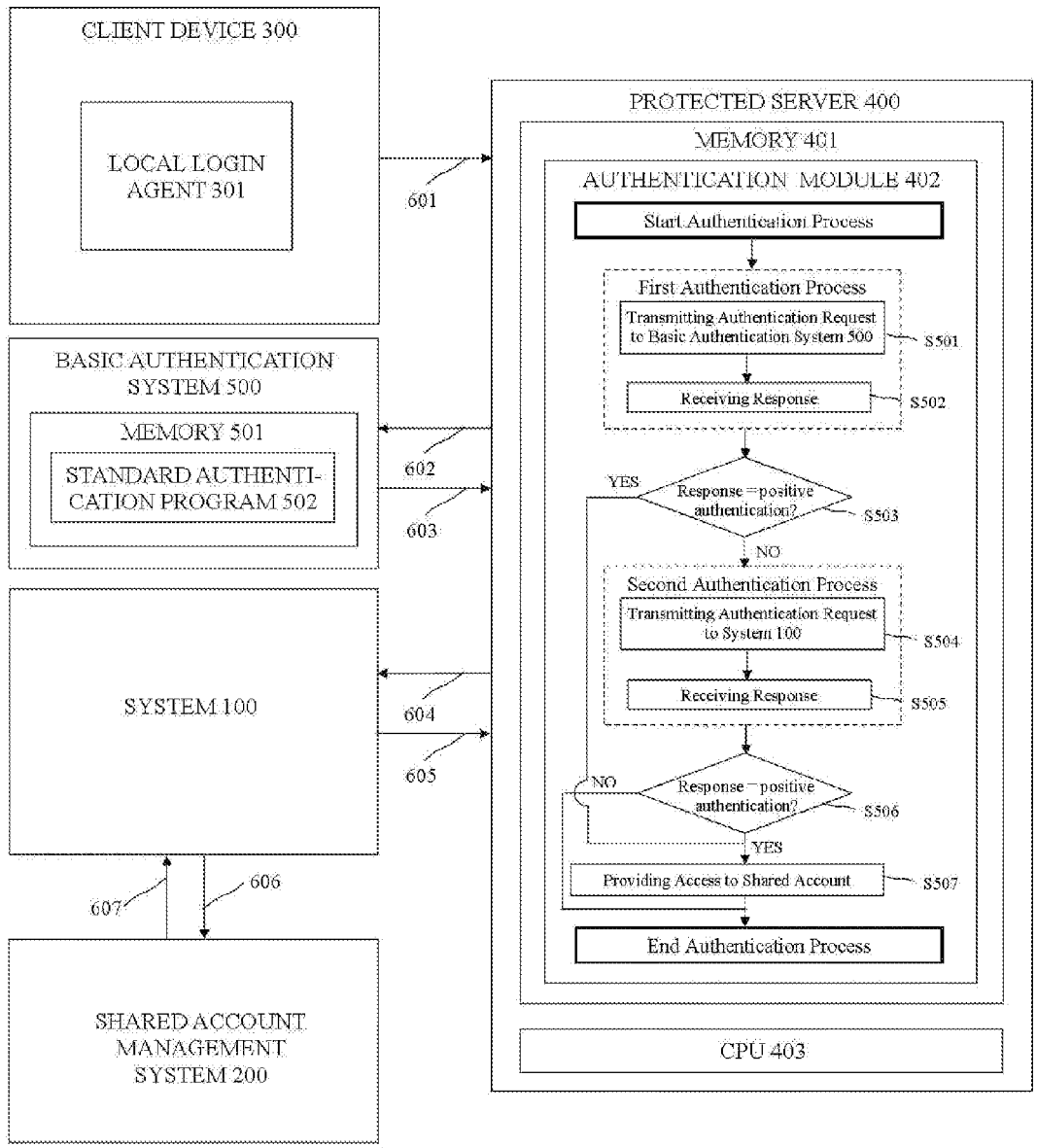
FIG. 8 depicts a block diagram of an example configuration for providing access to a first account using authentication information associated with a second account.
Figure 9:
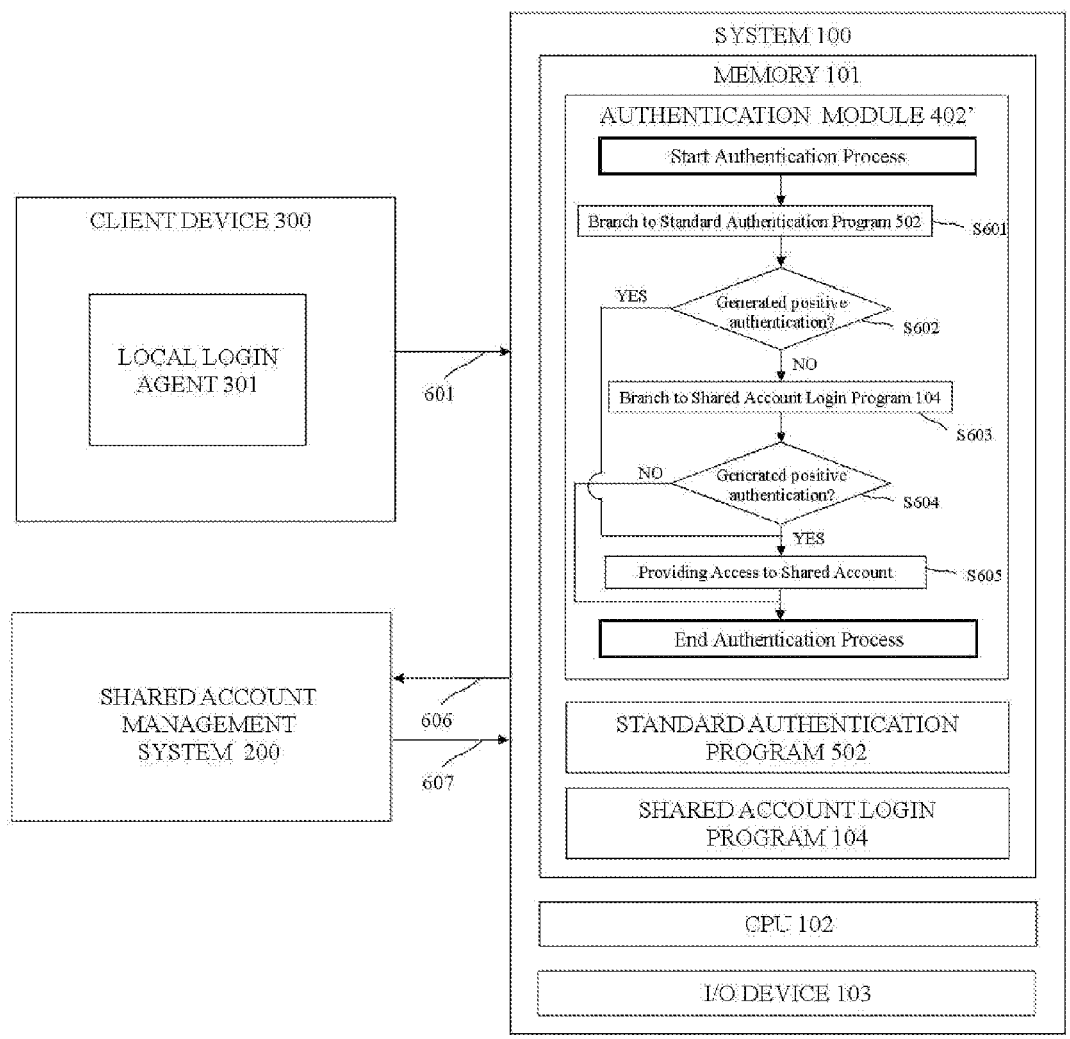
FIG. 9 depicts a block diagram of another example configuration for providing access to a first account using authentication information associated with a second account.

Referring now to FIGS. 8 and 9, example configurations for providing access to a first account using authentication information associated with a second account now are described. FIG. 8 depicts a block diagram of a first example configuration for providing access to a first account using authentication information associated with a second account. This first example configuration may exist in a network 1, as depicted in FIG. 1, comprising a system 100, servers 3, and devices 4. In FIG. 8, a user may want to log into a first account. The first account may be a shared account. Specifically, the first account may be shared account 1. Shared account 1 may be, for example, the "root" account in a Unix-like system. On a client device 300, the user may provide a first account identifier corresponding to the first account. Client device 300 may be a device 4 in network 1. Specifically, client device 300 may be, for example, a personal computer belonging to the user. Client device 300 may comprise a processor and a memory. The first account identifier may be, for example, "root." On client device 300, the user may also provide authentication information associated with a second account. The second account may be an account that is specific to the user (e.g., a client account). Specifically, the second account may be the first client account. The authentication information provided by the user may be referred to as "submitted authentication information."

The user may provide authentication information associated with the second account instead of authentication information associated with the first account because the user may not have immediate access to the latter. As described above, the user may have to log into a SAM system to obtain authentication information associated with a shared account (e.g., a one-time password). Thus, when the first account is a shared account, the user may not have authentication information associated with the first account on hand. Moreover, the user may find it burdensome to obtain such authentication information. Accordingly, when the user has authentication information associated with the second account available, the user may provide the authentication information associated with the second account in lieu of authentication information associated with the first account. The second account being the first client account, the user may provide "Password001" as the submitted authentication information.

Client device 300 may receive the first account identifier corresponding to the first account and the submitted authentication information. As noted above, client device 300 may comprise a processor and a memory. The memory may store computer-readable instructions (e.g., a login program) that, when executed by the processor, may cause the processor to operate as a local login agent 301. The processor, acting as local login agent 301, may transmit the first account identifier corresponding to the first account and the submitted authentication information to a protected server 400 via a signal 601.

Protected server 400 may receive the first account identifier and the submitted authentication information. Protected server 400 may comprise a memory 401 and a CPU 403. Memory 401 may store computer-readable instructions that may be executed by CPU 403. Those computer-readable instructions may comprise an authentication module 402. Authentication module 402, when executed by CPU 403, may cause CPU 403 to perform an authentication process. The authentication process may be represented by S501-S507.

The authentication process may comprise one or more authentication sub-processes. During a first authentication sub-process, CPU 403 may request authentication from a basic authentication system 500. Specifically, in 501, CPU 403 may transmit an authentication request to basic authentication system 500. The authentication request may comprise the first account identifier and the submitted authentication information. The authentication request may be transmitted to native authentication system 500 via a signal 602.

Basic authentication system 500 may comprise a memory 501. The memory 501 may store computer-readable instructions. Those computer readable instructions may comprise a standard authentication program 502, which, when executed by a processor, may cause basic authentication system 500 to perform a standard authentication check. Such execution may be triggered by the receipt of the authentication request from protected server 400. Accordingly, upon receiving signal 602, basic authentication system 500 may perform a standard authentication check. Specifically, basic authentication system 500 may compare the submitted authentication information with stored authentication information associated with the first account and check whether the submitted authentication information matches stored authentication information associated with the first account. As noted above, the first account may be shared account 1; thus, the stored authentication information associated with the first account may be a password for shared account 1. Basic authentication system 500 may retrieve the stored authentication information associated with the first account from an external source (e.g., shared account management system 200 or other device in network 1). Basic authentication system 500 then may compare the submitted authentication information with the retrieved stored authentication information. Based on that comparison, basic authentication system 500 may transmit a response to protected server 400. A signal 603 may represent that response.

Specifically, when basic authentication system 500 determines that the submitted authentication information matches the retrieved stored authentication information, basic authentication system 500 may generate a positive authentication signal and transmit that signal to protected server 400 as its response to the authentication request. The positive authentication signal may comprise a letter, word, phrase, number, or other alphanumeric sequence that represents that the submitted authentication information was successfully authenticated. In S502, protected server 400 may receive the response. Subsequently, in S503, CPU 403 may determine that the response comprises the positive authentication signal (S503: YES).

When protected server 400 determines that the response comprises the positive authentication signal (S503: YES), the process may proceed to S507, where CPU 403 may provide access to the first account. Alternatively, CPU 403 may further transmit the positive authentication signal to client device 300 (e.g., the user's computer system). Upon receiving the positive authentication signal, client device 300 may log the user into the first account on the protected server. See description of S207, depicted in FIG. 5, for more details on that process.

Alternatively, when basic authentication system 500 determines that the submitted authentication information does not match the retrieved stored authentication information, basic authentication system 500 may generate a negative authentication signal and transmit that signal as its response. The negative authentication signal may comprise a letter, word, phrase, number, or other alphanumeric sequence that represents that the submitted authentication information was not successfully authenticated. Similar to the above, in S502, protected server 400 may receive the response. Subsequently, in S503, CPU 403 may determine that the response does not comprise a positive authentication signal (S503: NO).

As noted above, the user may provide authentication information associated with the second account and not the first account. Accordingly, in such cases, basic authentication system 500 may determine that the submitted authentication information does not match the retrieved stored authentication information and, thus, may generate a negative authentication signal. And, in S503, CPU 403 may determine that the response from basic authentication system 500 does not comprise a positive authentication signal.

When protected server 400 determines that the response does not comprise a positive authentication signal (S503: NO), the process may proceed to a second authentication sub-process. During the second authentication sub-process, protected server 400 may request authentication from system 100. Similar to the above, protected server 400 may transmit an authentication request to system 100. The authentication request may comprise the first account identifier and the submitted authentication information. The authentication request may be transmitted to system 100 via a signal 604.

Upon receiving the authentication request (e.g., upon receiving the first account identifier and the submitted authentication information), system 100 may compare the submitted authentication information with stored authentication information associated with authorized accounts of the first account. As noted above, the first account may be shared account 1; thus, the authorized account of shared account 1 may comprise the first client account and the second client account and the stored authentication information may comprise the password "Password001" and the password "Password002." System 100 may obtain the stored authentication information associated with the first client account and the second client account by transmitting a message to shared account management system 200, requesting that stored authentication information. A signal 606 may represent that message. After receiving the message, shared account management system 200 may transmit the stored authentication information via a signal 607.

System 100 may determine whether the second account is an authorized account of the first account based on comparing the submitted authentication information with the stored authentication information. As noted above, the user may provide "Password001" as the submitted authentication information. System 100 may determine that the submitted authentication information (e.g., "Password001") matches the stored authentication information associated with the first client account (e.g., the password "Password001"). Accordingly, system 100 may determine that the second account is an authorized account, namely, the first client account. System 100 then may generate a positive authentication signal and transmit that signal in response to the authentication request to protected server 400. A signal 605 may represent the positive authentication signal.

Alternatively, when the second account is the second client account, the user may have provided "Password002" as the submitted authentication information. In such case, system 100 may determine that the submitted authentication information (e.g., "Password002") matches the stored authentication information associated with the second client account (e.g., the password "Password002"). Accordingly, system 100 may similarly determine that the second account is an authorized account.

When the user provides other authentication information (e.g., "Password003") as the submitted authentication information, system 100 may determine that the submitted authentication information does not match the stored authentication information associated with any authorized account of the first account. Even though the submitted authentication information may match authentication information associated with an authorized account of another shared account (e.g., shared account 2), system 100 would still determine that the second account is not an authorized account of the first account. Accordingly, in such cases, system 100 may determine that the second account is not an authorized account of the first account. Thus, system 100 may generate a negative authentication signal instead of a positive authentication signal to send to protected server 400.

In S505, protected server 400 may receive system 100's response (e.g., a positive authentication signal, a negative authentication signal) to the authentication request. In S506, CPU 403 may determine whether that response is a positive authentication signal. When the response is a positive authentication signal (S506: YES), the process may proceed to S507 and CPU 403 may provide access to the shared account to the user. When the response is not a positive authentication signal (S506: NO), the process may terminate.

In certain configurations, the steps of the authentication process of authentication module 402 may be arranged in a different order. In particular, the first authentication sub-process (e.g., S501-S502) may occur after the second authentication sub-process (e.g. S504-S505). Thus, the process may start with the second authentication sub-process, proceed to S503, and then proceed to the first authentication sub-process if a positive authentication signal has not been received.

Referring now to FIG. 9, a block diagram of a second example configuration for providing access to a first account using authentication information associated with a second account now is described. This second configuration may also exist in a network 1, as depicted in FIG. 1. FIG. 9 is similar to FIG. 8, except that system 100, as depicted in FIG. 9, is configured to execute standard authentication program 502 and an authentication module 402' in addition to shared account login program 104.

As in FIG. 9, on client device 300, a user may provide a first account identifier corresponding to the first account. On client device 300, the user may also provide submitted authentication information associated with the second account. Via signal 601, client device 300 may transmit the first account identifier and the submitted authentication information to system 100.

System 100 may receive the first account identifier and the submitted authentication information. As described above, system 100 may comprise a memory 101, a CPU 102, and a I/O device 103. Memory 101 may store computer-readable instructions. Specifically, those computer-readable instructions may comprise shared account login program 104, shared authentication program 502, and authentication module 402'. Similar to authentication module 402, authentication module 402', when executed by CPU 102, may cause CPU 102 to perform an authentication process. The authentication process may be represented by S601-S605.

In S601, CPU 102 may branch to and execute standard authentication program 502. Similar to FIG. 9, standard authentication program 502, when executed by a processor, may cause CPU 102 to perform a standard authentication check. Specifically, CPU 102 may compare the submitted authentication information with stored authentication information associated with the first account and check whether the submitted authentication information matches stored authentication information associated with the first account. When CPU 102 determines that the submitted authentication information matches the stored authentication information, CPU 102 may generate a positive authentication signal. When CPU 102 determines that the submitted authentication information does not match the stored authentication information, CPU 102 may generate a negative authentication signal.

The authentication process may then proceed to S602. In S602, CPU 102 may determine whether a positive authentication signal was generated as a result of executing standard authentication program 502. When a positive authentication signal was generated (S602: YES), the process may proceed to S605 and CPU 102 may provide access to the first account. When a positive authentication signal was not generated (e.g., a negative authentication signal was generated) (S602: NO), the process may proceed to S603.

In S603, CPU 102 may branch to and execute shared account login program 104. Specifically, CPU 102 may act as one or more of identity change detection device 105, authentication information requesting device 106, client account identifier determining device 107, authorized account identifier obtaining device 109, match determining device 110, authentication information comparing device 111, shared account management system login device 112, shared account checkout device 113, permission requesting device 114, and shared account access providing device 115 may compare the submitted authentication information with stored authentication information associated with authorized accounts of the first account and determine whether the second account is an authorized account of the first account. Such may require requesting (via signal 606) and receiving (via signal 607) the stored authentication information from shared account management system 200. When CPU 102 determines that the second account is an authorized account of the first account, CPU 102 may generate a positive authentication signal. When CPU 102 determines that the second account is not authorized account of the first account, CPU 102 may generate a negative authentication signal.

The authentication process may then proceed to S604, where CPU 102 may once again determine whether a positive authentication signal was generated, this time as a result of executing shared account login program 104. When a positive authentication signal was generated (S604: YES), the process may proceed to S605 and CPU 102 may provide access to the first account. When a positive authentication signal was not generated (e.g., a negative authentication signal was generated) (S604: NO), the process may terminate.

In S605, CPU 102 may transmit the positive authentication signal to client device 300. Upon receiving the positive authentication signal, client device 300 may provide access to the first account. Specifically, client device 300 may log the user into the first account on a protected server or a protected network (e.g., network 1). See description of S207, depicted in FIG. 5, for more details on that process.

In certain configurations, the steps of the authentication process of authentication module 402' may be arranged in a different order. In particular, CPU 102 may first perform S603 and then S601. Thus, the process may start with S603, proceed to S602, and then proceed to S601 if a positive authentication signal has not been received.

The flowcharts and diagrams in FIGS. 1-9 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   receiving from a user in a single request:
   a first account identifier corresponding to a first account, the first account being a shared account on a computer network, and
   authentication information associated with a second account;
   comparing the submitted authentication information with stored authentication information, the stored authentication information associated with a plurality of authorized accounts, the plurality of authorized accounts associated with clients authorized to access the first account;
   determining whether the second account is an authorized account based on comparing the submitted authentication information with the stored authentication information;
   in response to determining that the second account is not an authorized account:
   requesting permission to access the first account from an owner of the first account; and
   receiving the permission to access the first account, and providing seamless access to the first account in response to receiving the permission to access the first account.

2. The method of claim 1, wherein providing seamless access to the first account comprises sending a positive authentication signal to a computer,
   wherein the computer is configured to provide seamless access to the first account in response to receiving the positive authentication signal.

3. The method of claim 1, further comprising:
   determining a second account identifier corresponding to the second account;
   obtaining additional account identifiers corresponding to the plurality of authorized accounts; and
   determining whether the second account identifier matches an account identifier of the additional account identifiers;
   wherein comparing the submitted authentication information with the stored authentication information comprises verifying the submitted authentication information using the stored authentication information in response to determining that the second account identifier matches an account identifier of the additional account identifiers.

4. The method of claim 3, wherein determining the second account identifier comprises:
   identifying a key associated with an owner of the second account, the submitted authentication information comprising the key; and
   determining the second account identifier using the key.

5. The method of claim 1, further comprising:
   detecting an identity change instruction, the identity change instruction comprising an instruction to switch to the first account; and
   requesting the submitted authentication information,
   wherein comparing the submitted authentication information with stored authentication information comprises comparing the submitted authentication information with the stored authentication information in response to detecting the identity change instruction.

6. The method of claim 1, further comprising, in response to determining that the second account is an authorized account, checking out the first account on a shared account management system, wherein the shared account management system controls access to the first account.

7. A system comprising:
   a receiving device configured to receive from a user in a single request:
   a first account identifier corresponding to a first account, the first account being a shared account on a computer system, and
   submitted authentication information associated with a second account;
   a comparing device configured to compare a secret key of the submitted authentication information with stored authentication information, the stored authentication information associated with a plurality of authorized accounts, the plurality of authorized accounts associated with clients authorized to access the first account;
   a first determining device configured to determine whether the second account is an authorized account based on comparing the submitted authentication information with the stored authentication information; a permission requesting device configured to request permission to access the first account from an owner of the first account in response to determining that the second account is not an authorized account; and
   a third receiving device configured to receive the permission to access the first account from the owner of the first account;
   wherein the access providing device is configured to provide seamless access to the first account in response to receiving the permission to access the first account.

8. The system of claim 7, wherein the access providing device is configured to send a positive authentication signal to a computer,
   wherein the computer is configured to provide seamless access to the first account in response to receiving the positive authentication signal.

9. The system of claim 7, further comprising:
   a second determining device configured to determine a second account identifier corresponding to the second account;
   a second obtaining device configured to obtain additional account identifiers corresponding to the plurality of authorized accounts; and
   a third determining device configured to determine whether the second account identifier matches an account identifier of the additional account identifiers;
   wherein the comparing device is configured to verify the submitted authentication information using the stored authentication information in response to determining that the second account identifier matches an account identifier of the additional account identifiers.

10. The system of claim 9, wherein the second determining device comprises:
    an identifying device configured to identify a key associated with an owner of the second account, the submitted authentication information comprising the key; and
    a fourth determining device configured to determine the second account identifier using the key.

11. The system of claim 7, further comprising:
    a detecting device configured to detect an identity change instruction, the identity change instruction comprising an instruction to switch to the first account; and
    an authentication information requesting device configured to request the submitted authentication information, wherein the comparing device is configured to compare the submitted authentication information with the stored authentication information in response to detecting the identity change instruction.

12. The system according to claim 7, further comprising, a checkout device configured to check out the first account on a shared account management system in response to determining that the second account is an authorized account, wherein the shared account management system controls access to the first account.

13. A computer program product comprising:
a non-transitory computer readable storage medium having computer readable program code embodied therewith, the computer readable program code comprising:
computer readable program code configured to receive, from a user in a single request:
a first account identifier corresponding to a first account, the first account being a shared account on a computer system, and
authentication information associated with a second account;
computer readable program code configured to compare the submitted authentication information with stored authentication information, the stored authentication information associated with a plurality of authorized accounts, the plurality of authorized accounts associated with clients authorized to access the first account;
computer readable program code configured to determine whether the second account is an authorized account based on comparing the submitted authentication information with the stored authentication information;
computer readable program code configured to request permission to access the first account from an owner of the first account in response to determining that the second account is not an authorized account; and
computer readable program code configured to receive the permission to access the first account;
wherein the computer readable program code configured to provide seamless access to the first account in response to receiving the permission to access the first account.

14. The computer program product according to claim 13, wherein the computer readable program code configured to provide seamless access to the first account is configured to send a positive authentication signal to a computer,
wherein the computer is configured to provide seamless access to the first account in response to receiving the positive authentication signal.

15. The computer program product according to claim 13, further comprising:

computer readable program code configured to determine a second account identifier corresponding to the second account;
computer readable program code configured to obtain additional account identifiers corresponding to the plurality of authorized accounts; and
computer readable program code configured to determine whether the second account identifier matches an account identifier of the additional account identifiers;
wherein the computer readable program code configured to compare the submitted authentication information with stored authentication information is configured to verify the submitted authentication information using the stored authentication information in response to determining that the second account identifier matches an account identifier of the additional account identifiers.

16. The computer program product according to claim 15, wherein the computer readable program code configured to determine the second account identifier comprises:
computer readable program code configured to identify a key associated with an owner of the second account, the submitted authentication information comprising the key; and
computer readable program code configured to determine the second account identifier using the key.

17. The computer program product according to claim 13, further comprising:
computer readable program code configured to detect an identity change instruction, the identity change instruction comprising an instruction to switch to the first account; and
computer readable program code configured to request the submitted authentication information,
wherein the computer readable program code configured to compare the submitted authentication information with stored authentication information is configured to compare the submitted authentication information with the stored authentication information in response to detecting the identity change instruction.

18. The computer program product according to claim 13, further comprising, computer readable program code configured to check out the first account on a shared account management system in response to determining that the second account is an authorized account, wherein the shared account management system controls access to the first account.

* * * * *